Figure 1:
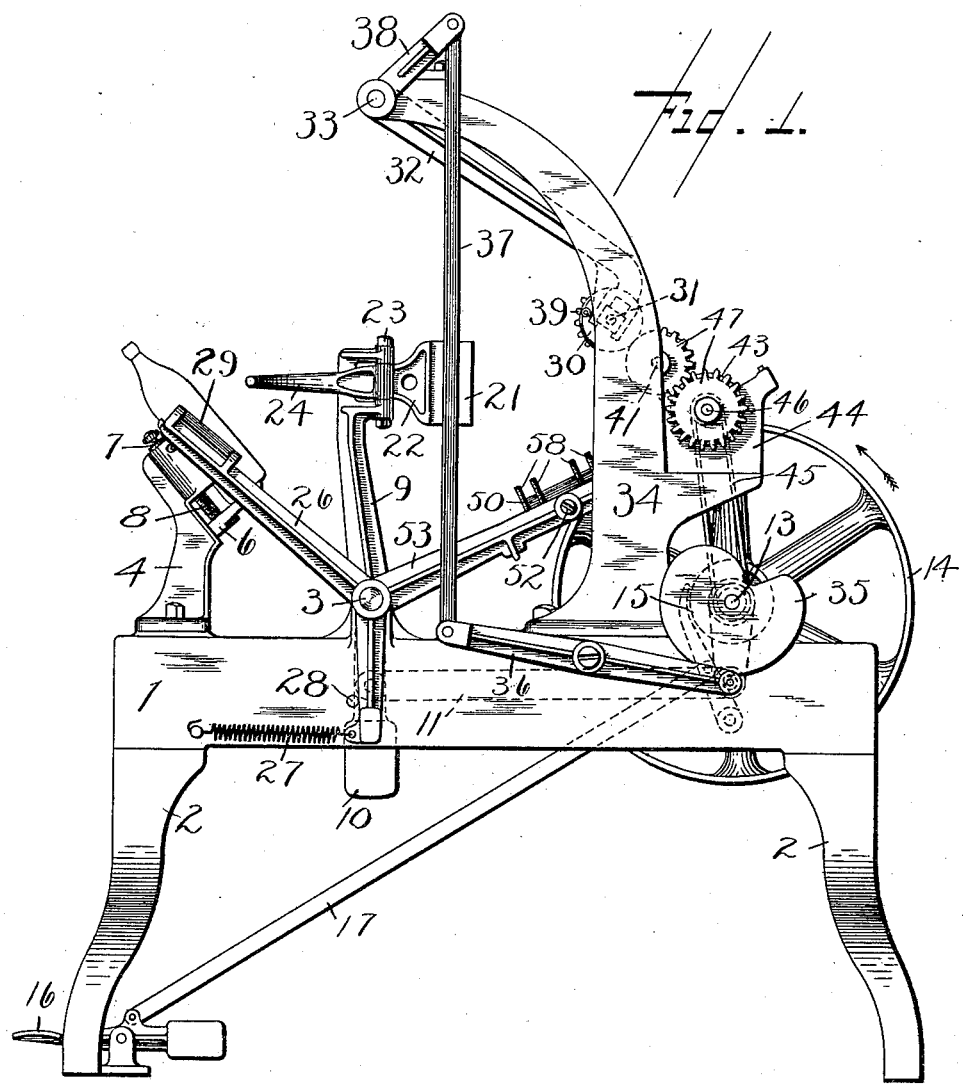

No. 630,342. Patented Aug. 8, 1899.
G. F. GIPNER.
LABELING MACHINE.
(Application filed Jan. 3, 1898.)
(No Model.) 9 Sheets—Sheet 1.

Witnesses.
Chas. F. Logan
G. Willard Rich.

Inventor.
George F. Gipner
by Church & Church
his
Attorneys

No. 630,342. Patented Aug. 8, 1899.
G. F. GIPNER.
LABELING MACHINE.
(Application filed Jan. 3, 1898.)
(No Model.) 9 Sheets—Sheet 2.
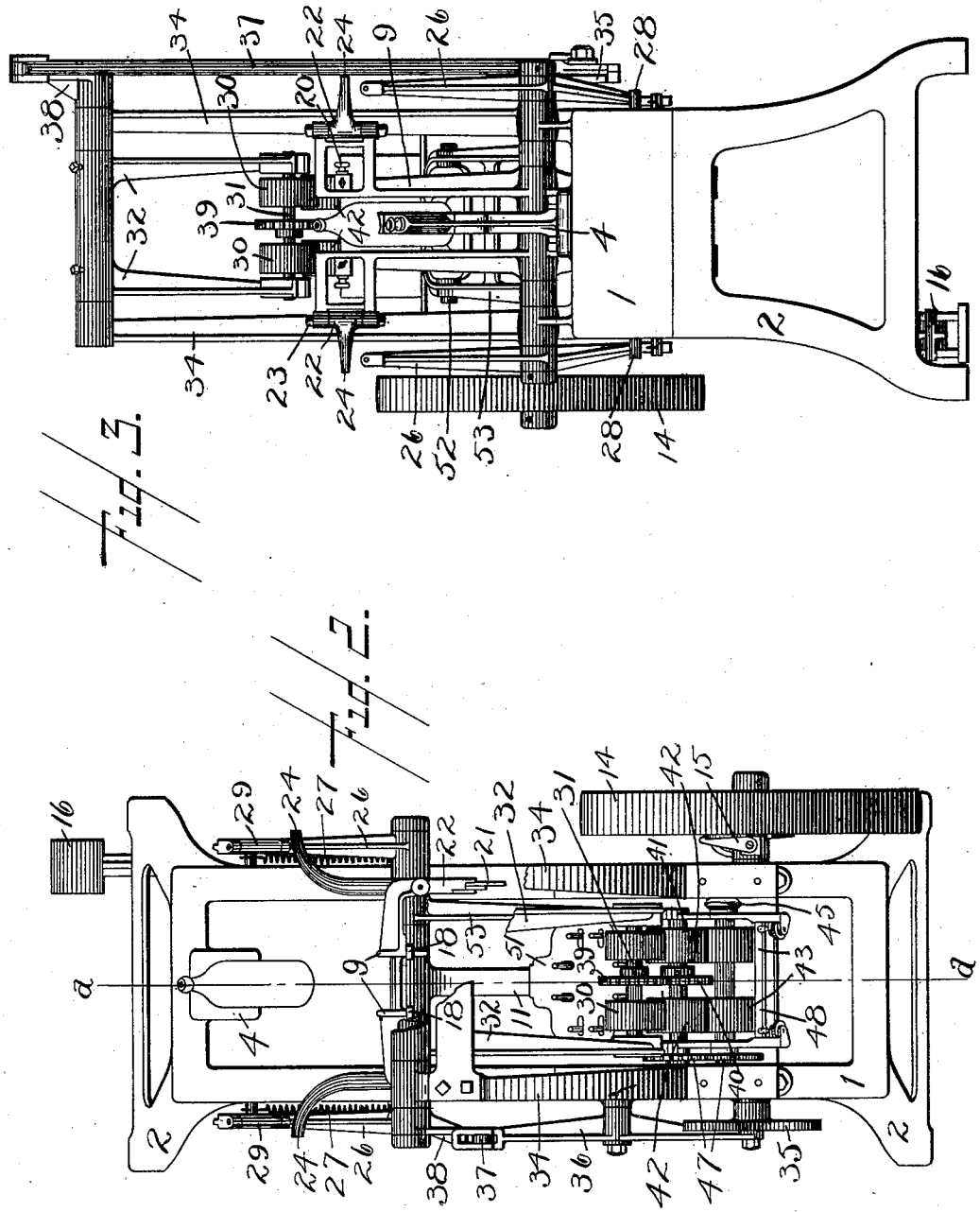
Witnesses. Inventor.

No. 630,342. Patented Aug. 8, 1899.
G. F. GIPNER.
LABELING MACHINE.
(Application filed Jan. 3, 1898.)
(No Model.) 9 Sheets—Sheet 3.
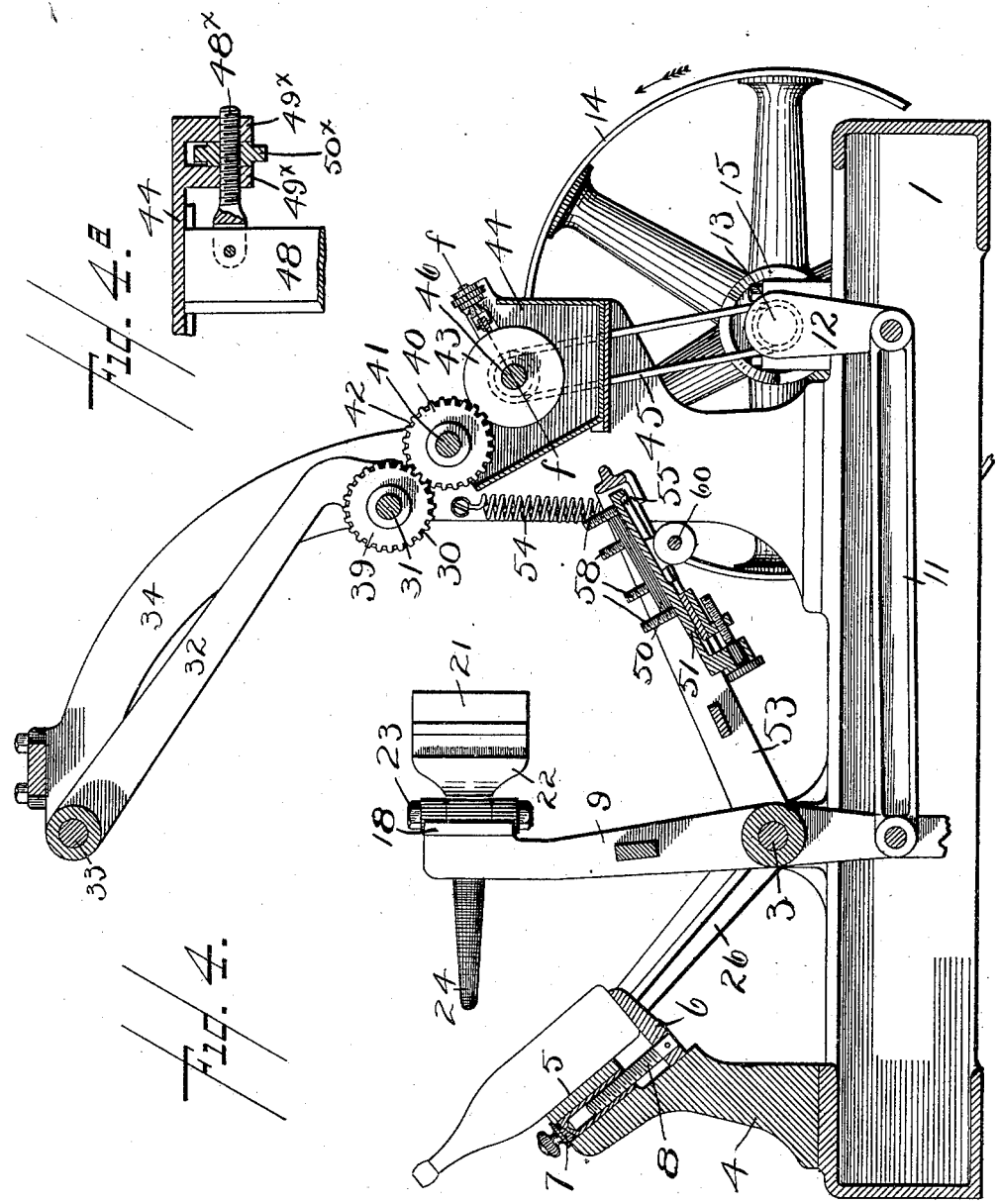
Witnesses.
Chas. F. Logan,
G. Willard Rich.
Inventor.
George F. Gipner
by Church & Church
his
Attorneys No. 630,342. Patented Aug. 8, 1899.
G. F. GIPNER.
LABELING MACHINE.
(Application filed Jan. 3, 1898.)
(No Model.) 9 Sheets—Sheet 4.
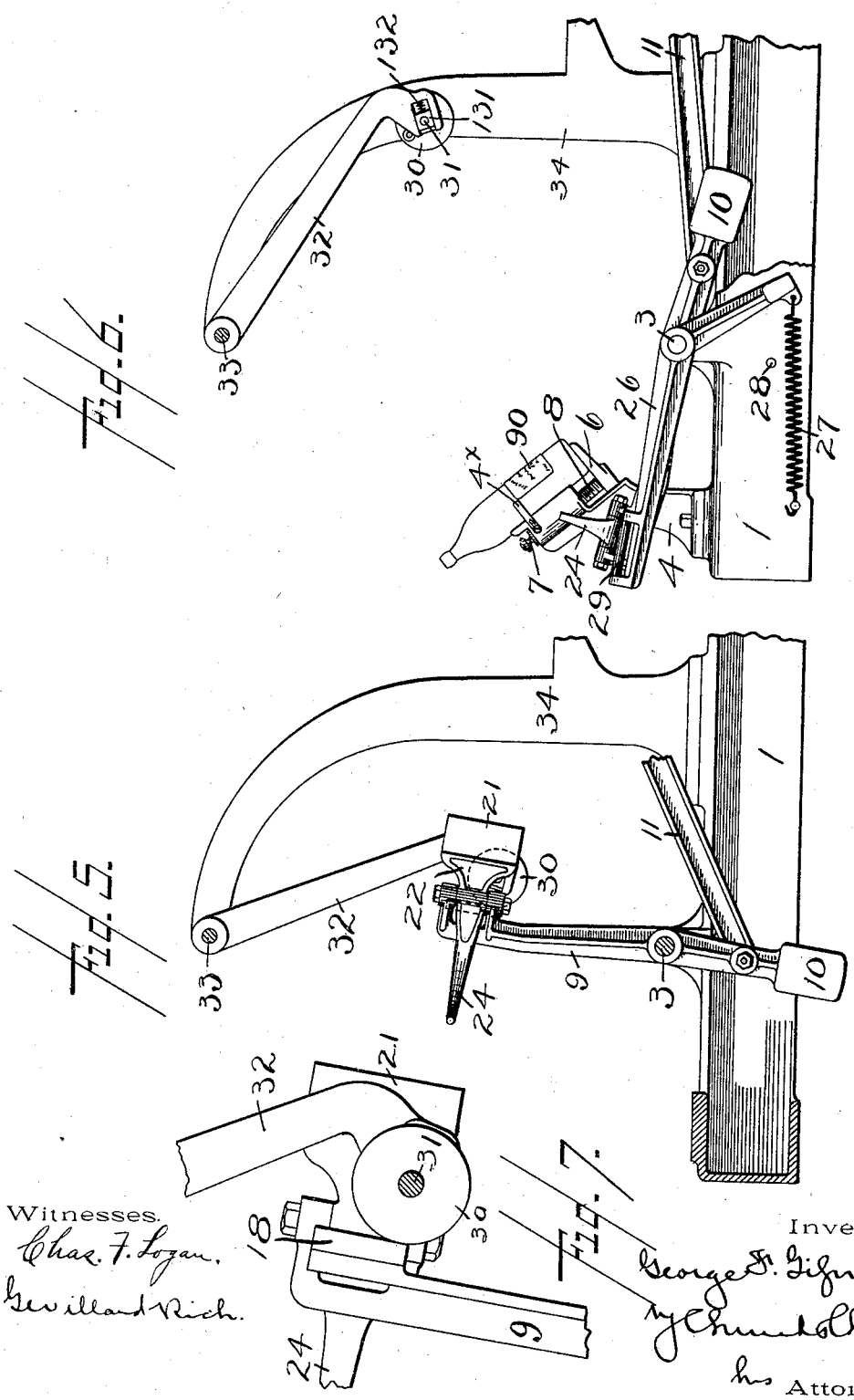
Witnesses.
Chas. F. Logan.
Gev illand Rich.
Inventor.
George F. Gipner
Attorneys
THE NORRIS PETERS CO., PHOTO-LITHO., WASHINGTON, D. C.

No. 630,342. Patented Aug. 8, 1899.
G. F. GIPNER.
LABELING MACHINE.
(Application filed Jan. 3, 1898.)
(No Model.) 9 Sheets—Sheet 5.
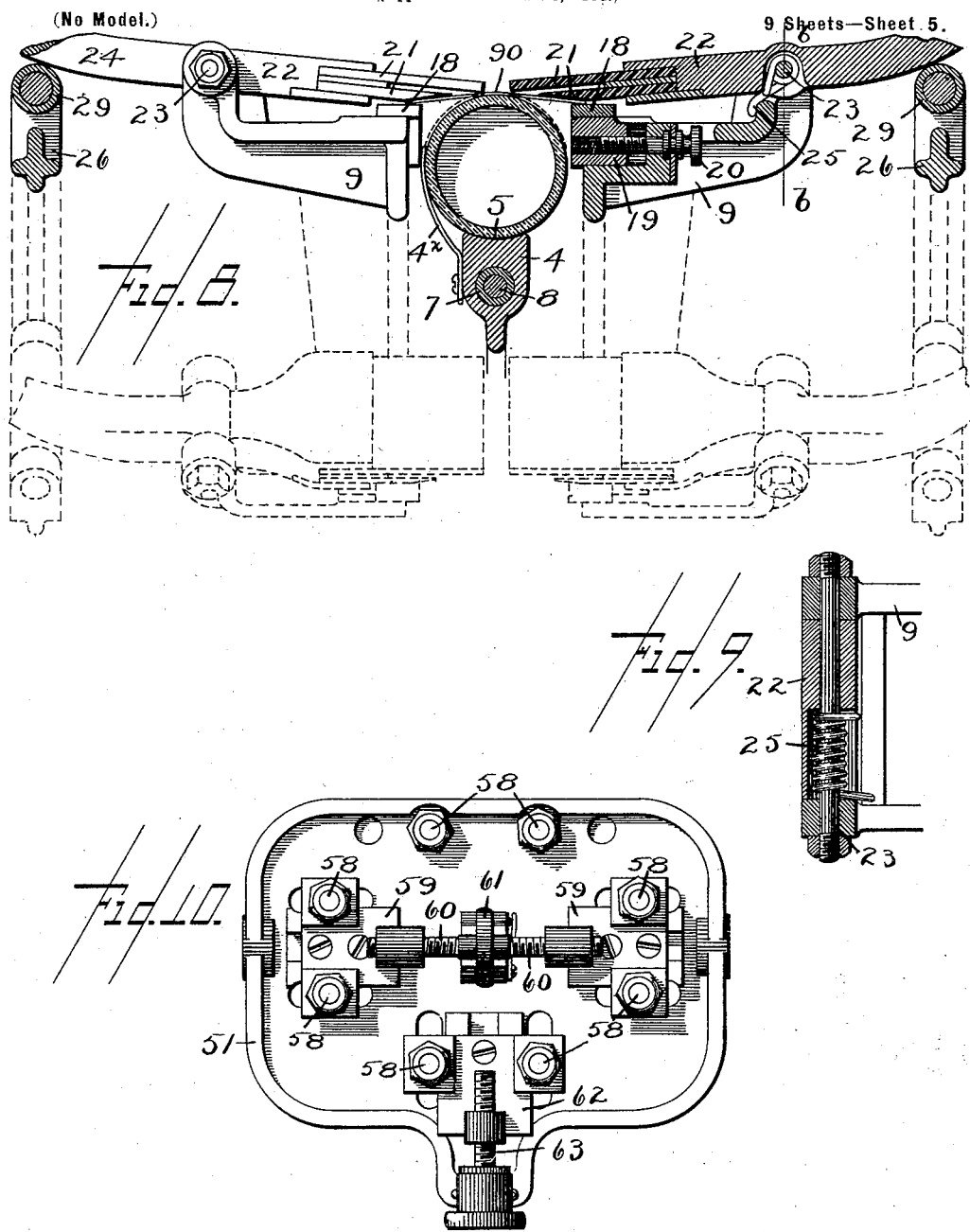

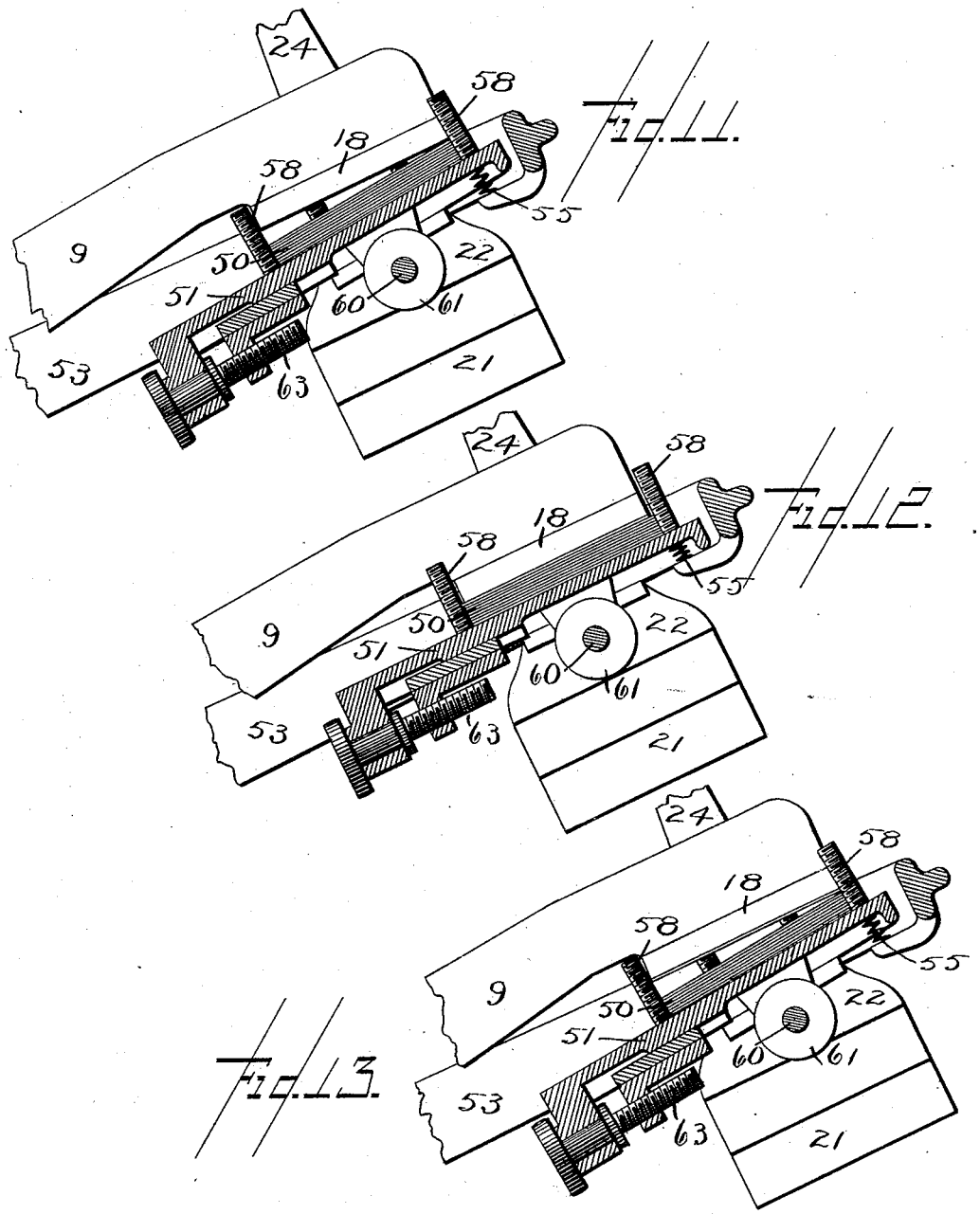

No. 630,342. Patented Aug. 8, 1899.
G. F. GIPNER.
LABELING MACHINE.
(Application filed Jan. 3, 1898.)
(No Model.) 9 Sheets—Sheet 7.
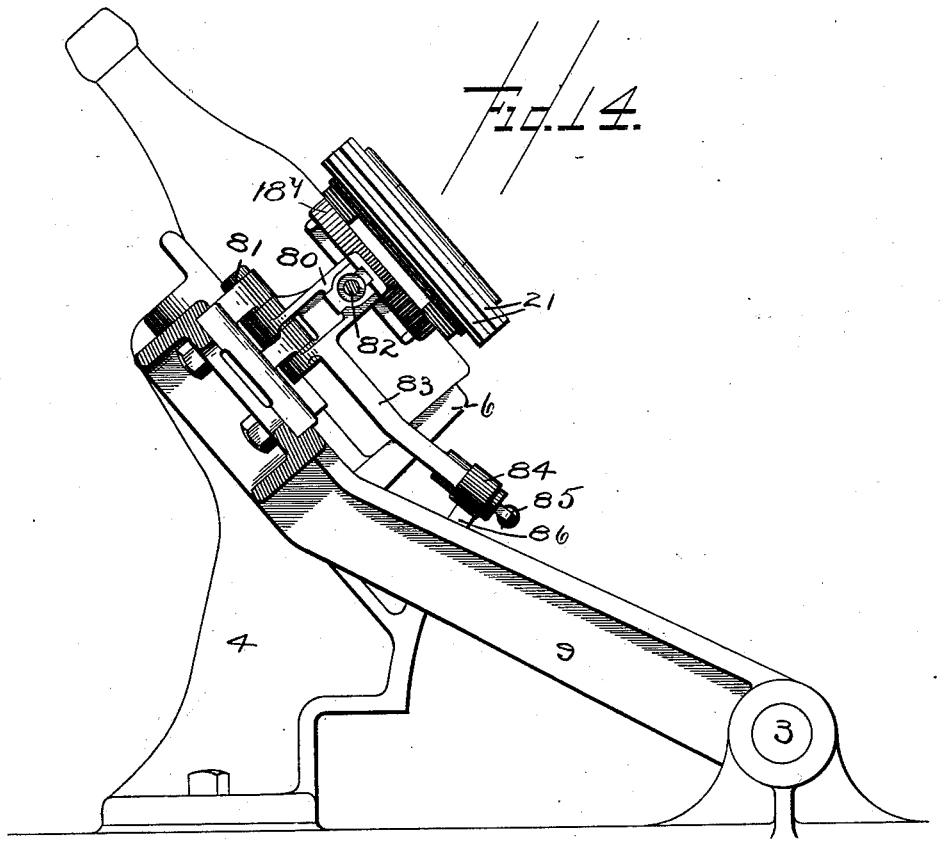
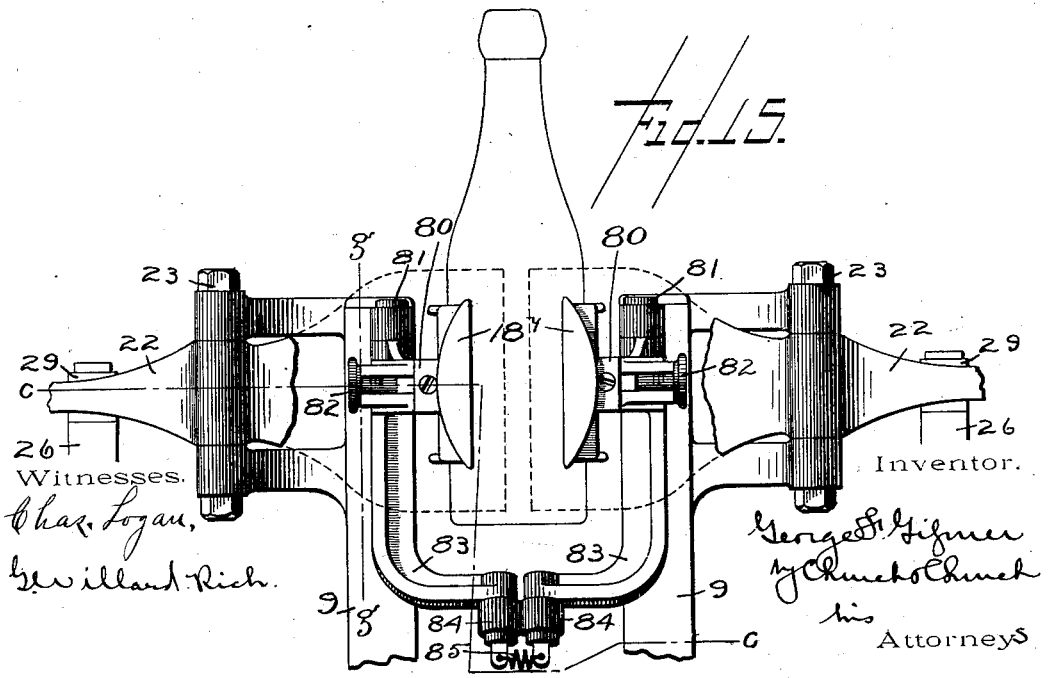

No. 630,342. Patented Aug. 8, 1899.
G. F. GIPNER.
LABELING MACHINE.
(Application filed Jan. 3, 1898.)
(No Model.) 9 Sheets—Sheet 8.
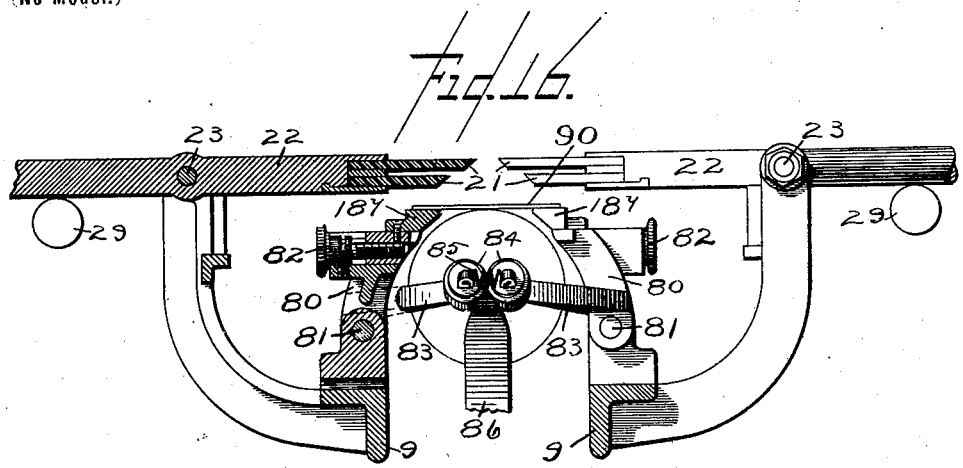
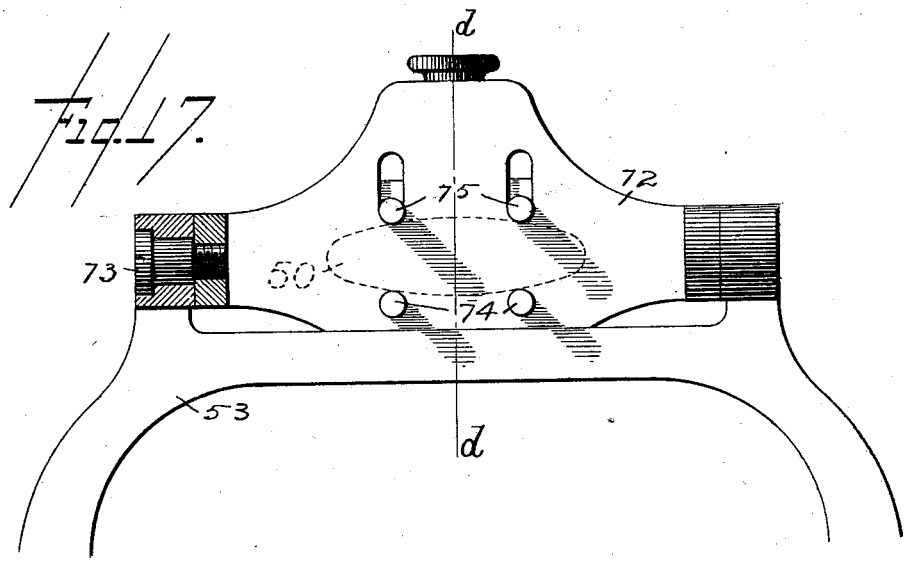
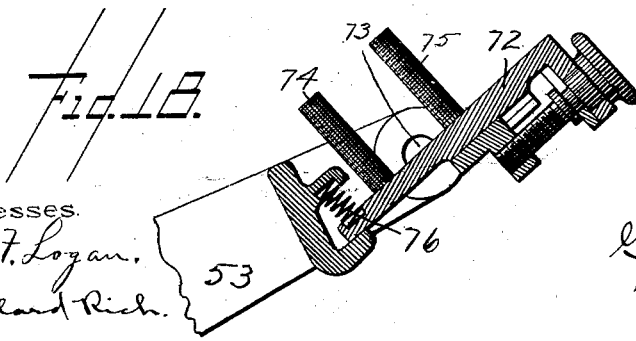
Witnesses.
Chas. F. Logan.
G. Willard Rich.
Inventor.
George F. Gipner
by Church & Church
his Attorneys
THE NORRIS PETERS CO., PHOTO-LITHO., WASHINGTON, D. C.

No. 630,342. Patented Aug. 8, 1899.
G. F. GIPNER.
LABELING MACHINE.
(Application filed Jan. 3, 1898.)
(No Model.) 9 Sheets—Sheet 9.

Witnesses. Inventor.
Chas. F. Logan. George F. Gipner
G. Willard Rich. by Church & Church
his Attorneys

UNITED STATES PATENT OFFICE.

GEORGE F. GIPNER, OF NEW YORK, N. Y., ASSIGNOR, BY MESNE ASSIGNMENTS, OF ONE-HALF TO THE YAWMAN & ERBE MANUFACTURING COMPANY, OF ROCHESTER, NEW YORK.

LABELING-MACHINE.

SPECIFICATION forming part of Letters Patent No. 630,342, dated August 8, 1899.

Application filed January 3, 1898. Serial No. 665,447. (No model.)

*To all whom it may concern:*

Be it known that I, GEORGE F. GIPNER, of New York city, in the county and State of New York, have invented certain new and useful Improvements in Labeling-Machines; and I do hereby declare the following to be a full, clear, and exact description of the same, reference being had to the accompanying drawings, forming a part of this specification, and to the reference-numerals marked thereon.

My present invention relates to labeling-machines particularly adapted for applying labels to bottles, and has for its objects to provide one which is simple in construction, capable of rapid action, and in which the labels are applied firmly and with certainty to the bottles or similar articles; and to these and other ends it consists in the improved mechanism hereinafter described, the novel features being pointed out particularly in the claims at the end of this specification.

Figure 19:
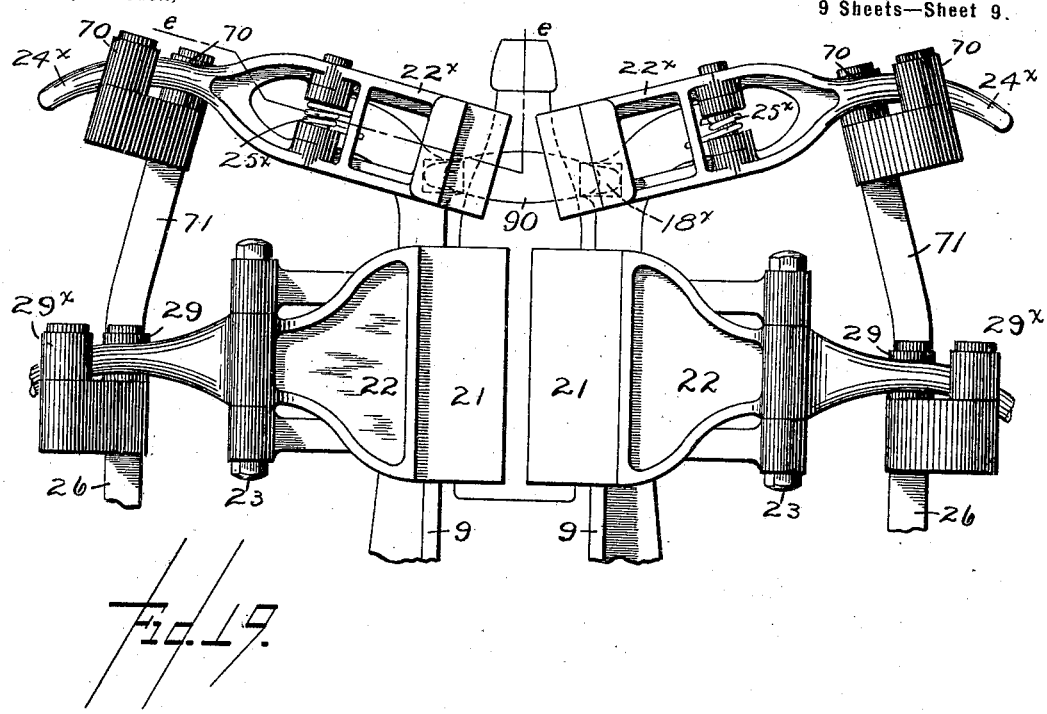
Figure 20:
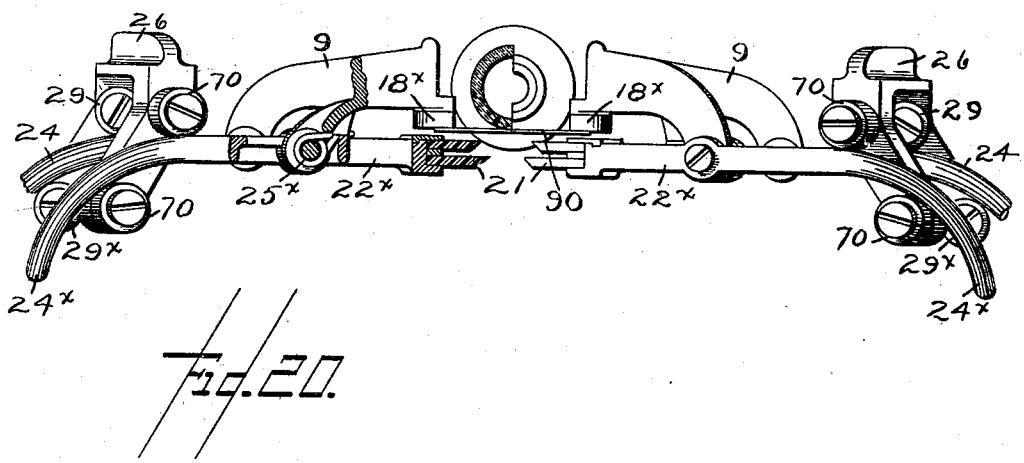

In the drawings, Figure 1 is a side elevation of a labeling-machine constructed in accordance with my invention; Fig. 2, a plan view of the same; Fig. 3, an end elevation; Fig. 4, a longitudinal sectional view on the line $a\,a$ of Fig. 2; Fig. 4$^a$, a section on the line $f\,f$ of Fig. 4; Fig. 5, an elevation showing the position of the label-carrier during the application of paste thereto; Fig. 6, a side elevation showing the position of the parts after the labels have been applied; Fig. 7, a sectional view showing the paste-roller coöperating with the label-carrier; Fig. 8, a cross-sectional view showing the application of the label to the bottle; Fig. 9, a sectional view taken on the line $b\,b$ of Fig. 8; Fig. 10, a bottom plan view of the label-support, showing the adjusting means; Figs. 11, 12, and 13, sectional views showing the label-support and label-carrier coöperating therewith; Fig. 14, a sectional view on the line $g\,g$ of Fig. 15; Fig. 15, a plan view of the same; Fig. 16, a sectional view on the line $c\,c$ of Fig. 15; Fig. 17, a plan view, partly in section, of the label-holder for coöperating with the auxiliary or neck-label-applying devices shown at the top of Fig. 19; Fig. 18, a vertical sectional view taken on the line $d\,d$ of Fig. 17; Fig. 19, a front view of devices for applying two labels to a bottle; Fig. 20, a sectional view taken on the line $e\,e$ of Fig. 19.

Similar reference-numerals indicate similar parts.

1 indicates the bed-plate or main frame of the machine resting on suitable legs 2 and having bearings on the upper portion thereof near one end, in which is loosely journaled a transverse shaft 3, supporting some of the operating parts of the machine, and also mounted upon the upper portion of the frame 1 is a supplemental frame 34, carrying paste-applying devices, as will be hereinafter described.

At one end of the frame 1 is a bracket or frame 4, constituting a rest for the bottle or other article to which the label is to be applied, said rest having an inclined face 5, arranged at an angle to the base-frame and slightly tangential of the shaft 3, and an adjustable supporting-foot 6, movable in the plane of the rest 5 and operated vertically by means of a threaded sleeve 7 operating in the bracket 4 and coöperating with a screw 8 on the foot, as shown particularly in Fig. 4. Pivoted loosely upon the shaft 3 is an oscillatory label-carrying frame 9, preferably provided with a counterweight 10 at its lower end and connected by a pitman 11 with a crank 12, mounted upon a rotary shaft 13, journaled in bearings at the opposite end of the frame 1, said shaft having upon it a driving belt-pulley 14, between which and the shaft is arranged a suitable clutch, (indicated generally by 15,) controlled by means of a treadle 16 through a link or rod 17; but as neither this clutch nor the particular construction thereof forms a part of my present invention it is unnecessary to describe it specifically herein. Suffice it to say that by the manipulation of the treadle the driving-shaft is connected or disconnected from the belt-wheel 14 in a manner well understood by those skilled in the art.

Arranged upon the upper end of the frame 9 are label carrying and applying or affixing devices adapted to pick up a label from a pile when the frame is moved in one direction by the pitman 11 and when moved in the other direction to apply said label to the bottle on the bottle-rest and cause it to firmly adhere thereto. The upper end of the frame 9 is bifurcated, and the two arms thus formed are adapted to pass on opposite sides of the bottle-rest and are each provided on one side with flat surfaces or shoes 18, preferably arranged upon blocks 19, relatively adjustable toward and from each other by means of screws 20, arranged on the frame, as shown in Fig. 8, the label to be applied to the bottle being attached by paste to the said shoes 18 and extending across the space between, so as to contact with the bottle as the frame is moved beyond it. Also mounted upon the oscillatory frame 9 are the label-affixers for affixing the labels to the bottle, consisting in the present instance of strips 21 of rubber or rubber cloth or other flexible and preferably elastic material, secured to the inner ends of arms 22, pivoted upon bolts 23 on the oscillatory frame and having the outer ends curved somewhat, as at 24. I prefer to construct each of the affixers 21 of two rubber strips of different lengths placed one above the other, the shorter strips beneath, so that the shorter ones will first contact with the label and then the longer one, thereby making a more secure fastening. The portion of the affixers engaging the label might, if desired, consist of rubber rollers, but in any event are arranged when the arms are turned toward each other to project over the face of the bottle and in close proximity to the label 90, so that as they are forced relatively beyond the bottle they will fasten the label thereon, the ends of the latter sliding from the shoes 18 and the affixers firmly wiping and affixing said ends by the paste adhering thereto as they are passed beyond the bottle, as shown in dotted lines in Fig. 8. The affixer-arms 22 are normally turned to the position shown in full lines in Figs. 1, 2, and 4, away from the surfaces 18 and in the plane of movement of the oscillatory frame, by means of springs 25 encircling the bolts 23 and engaging the arms and frame, respectively, as shown particularly in Fig. 9, and are only turned over the label carried by the shoes 18 just before the label is engaged with the bottle. For the purpose of causing the affixers to move over the label just before the label engages the bottle and to hold them in engagement I mount loosely upon the outer ends of the shaft 3 arms 26, having the downward extensions connected by springs 27 with the main frame 1, said springs operating to hold the arms against stops 28, so as to maintain the upper ends on opposite sides of the bottle-support, as shown in Fig. 1. The upper ends of these arms 26 are preferably provided with rollers 29, with which the curved outer ends 24 of the affixers coöperate, so that as the oscillatory frame 9 moves over the bottle the arms 22 will be moved to the position shown in Fig. 8, and the further movement of the frame 9 beyond the bottle will maintain the affixers in engagement with the label and bottle, the arms 26 being moved by the frame against the tension of the springs 27 and maintaining the affixers toward each other until the bottle-support is passed and the frame has oscillated in the opposite direction to allow the arms 26 to engage the stops 28, when the springs 25 on the affixer-arms will cause the affixers to assume the position shown in Fig. 1, leaving the shoes 18 unobstructed. When the frame 9 moves in a direction away from the bottle, the shoes 18 are supplied with paste after the affixers have been opened and during the first portion of their movement, and the continued movement of the frame to the rear causes said shoes 18 to come in contact with the rear side of the next label that is to be applied to the bottle, causing the adherence of the label to said shoes to enable it to be carried over the bottle as the frame moves in the opposite direction again and to be applied in the manner described.

The devices for applying paste to the shoes 18 of the label-carrier consist in the present instance of wheels or rollers 30, arranged on a shaft 31, loosely mounted in bearing 131, backed by springs 132 and sliding in the slotted ends of a bifurcated oscillatory frame 32, rigidly connected to a shaft 33, mounted at the upper end of the frame 34, said shaft 33 being arranged to be oscillated from a cam 35, arranged on the shaft 13, by suitable connections, such as a pivoted lever 36 and pitman 37 and an arm 38, the latter being attached to one end of the shaft 33, as shown in Fig. 1. The shaft 31 is provided with a centrally-arranged gear-wheel 39, arranged when the frame 32 is swung toward the rear of the machine to mesh with a corresponding gear 40, centrally arranged on a shaft 41, carrying paste-transfer rollers 42, revolving in contact with the paste-rollers 43, arranged in a trough-receptacle 44 on the frame 34, containing paste, gum, or any suitable adhesive. The rollers 43 are rotated by a belt 45, extending around a pulley on the shaft 46 thereon and also around a suitable pulley on the main shaft 13, and the paste-rollers 42 are constantly rotated by gears 47, Figs. 1 and 2, between the shafts 41 and 46.

For the purpose of positively and accurately gaging the quantity of paste applied to the paste-rollers I provide a scraper or doctor 48, coöperating with the rollers 43 and having screws $48^\times$ passing loosely through ears $49^\times$ on the sides of the receptacle and engaged by the thumb-nuts $50^\times$, arranged between said ears, as in Fig. $4^a$. This arrangement for accurate adjustment is very desirable, as the paper of which labels are composed varies greatly, and to properly and cleanly affix them requires a nice adjustment of the quantity of paste applied.

The paste-rollers 30, it will be noted, move in an arc intersecting that through which the shoes 18 pass, and the movement of the frame 32 is so timed relative to the movement of the carrier-frame 9 that as the last-mentioned frame moves to the right, Fig. 4, the rollers 30 will be brought in contact with the shoes 18, as shown in Figs. 5 and 7, and the paste thereon will be transferred to the shoes 18, over which latter they roll from the bottom upward, and as soon as the shoes have been covered the frame 32 will be moved by the cam back to the position shown in Figs. 1, 2, 4, and 6, with the gears 39 and 40 in contact, thereby applying to the rollers 30 a fresh quantity of paste to be supplied to the shoes at the next operation.

The labels may be applied to the shoes of the label-carrier by any suitable devices; but I prefer to have the carrier pick them up one at a time from a pile (indicated by 50) arranged upon a suitable label-holder 51, pivoted at 52 upon an arm or frame 53, which latter is pivoted upon the shaft 3, on which the oscillating frame 9 operates, the outer end of said frame 53 being supported by a spring, such as 54, permitting the label-support to yield slightly, thus allowing for any variation in height of the pile of labels and insuring a strong adhesion between the top label and the pasted shoes 18.

While any form of label-holder might be employed which would position the labels properly with relation to the carrier and cause the lifting of the top one, I prefer to provide mechanism for insuring the proper lifting and separation of the top one only, and to this end pivot said holder 51, as shown, and provide a spring 55 beneath the end thereof, which normally tilts it upwardly, as shown in Figs. 4 and 11, whereby the face of the top label of the pile will be maintained at a slight angle relative to the pasted shoes on the carrier, so that, the parts being in the position shown in Figs. 4 and 11, when the carrier is moved downward upon the pile the outer ends of the shoes engage the outer end of the label first, and as the carrier continues its downward movement the holder is tilted against the spring 55 to the position shown in Fig. 12 until the whole face of the label is brought in contact with the shoes 18 on the carrier, this operation moving the top label downward, backward, or toward the shaft 3, as shown in Fig. 12, for the purpose of loosening said label from the pile in substantially the same manner that a person would separate superposed sheets of paper by moistening his finger and drawing the top sheet backward from the end of the pile. When the carrier moves upward again, as shown in Fig. 13, the lower end of the label will be lifted from the pile first by reason of the tendency of the spring 55 to tilt the holder, this operation allowing air to enter beneath said end, so that the next succeeding label will not be lifted by air-pressure. This engagement of the outer end of the tilted pile of labels also prevents the paste on the carrier from being scraped off on the edge of the pile of labels, which would cause the pile to adhere and would interfere with the proper operation. The holder is provided with serrated steadying-pins 58, preferably threaded, as shown, the lower pair, however, being sufficiently small to permit the backward movement of the top label, as shown in Fig. 12, without materially damaging it, the slight indentations formed by this movement not being particularly noticeable when the label is applied to the bottle. The centering-pins 58 at the end of the holder are preferably stationary, while the side pins are connected to movable blocks 59, sliding in suitable ways in the holder and adjusted by a right and left screw 60, having a centrally-arranged operating or thumb portion 61, as shown particularly in Fig. 10. The pins at the lower end of the holder are also mounted upon an adjustable block 62, adapted to be moved by an adjusting-screw 63, these adjustments permitting the device to be used for labels of various sizes.

The operation of the machine as a whole will now be understood.

A pile of labels having been placed in the label-holder face downward and the holder, label-carrier, and bottle-support having been adjusted to properly coöperate and power having been applied to the belt-pulley 14, the operator starts the machine by a pressure upon the treadle 16, causing the shaft 13 to rotate in the direction of the arrow in Figs. 1 and 4. This operation causes the label-carrier frame 9 to move over toward the bottle-rest and then to move back and down upon the pile of labels, this causing the tilting of the label-holder on its pivot and carrying the label-holder support downward against the tension of its spring, and when the crank 12 passes across the center the carrier will be moved back, and if paste has been applied to the shoes 18 by the rollers 30 the shoes will pick up and carry the top label and apply it to the bottle, causing it to adhere by the paste taken from the shoes, the affixers securing it firmly thereon. The affixers are moved over the label by the rollers 29 on the arms 26, and the latter are moved down against the tension of their springs, as previously described. After the affixers have passed beyond the bottle to the position in dotted lines in Fig. 8 the operator removes the bottle from the rest and the carrier moves back toward the label-holder; but before the engaging portion of the carrier reaches the labels the depressed portion of the cam 35 comes opposite the end of the lever 36, causing the pasting-rollers 30 to move from the rollers 42, with which they have been in contact, into the path of the shoes 18 on the carrier-frame and roll over the latter, thus applying an even coating of paste to them, but not interfering with the downward movement, so that the shoes will engage with the top label of the pile and carry it over and apply it to another bottle which the operator has in the meantime placed upon the bottle-rest. As soon as the paste-rollers 30 have applied paste to the shoes the higher portion of the cam 35 will cause them to return into contact with the rollers 42 and out of the path of the carrier in its movement toward the bottle-support. The quantity of paste applied to the labels by the shoes is quite sufficient to cause the label to adhere firmly to the bottle when applied and affixed thereon.

From this construction it will be seen that the movable parts operate from a single center—i. e., the shaft 3—and in concentric arcs, so that the construction is materially simplified, there is no opportunity for the parts to get out of adjustment, and I am enabled to dispense with cams or separate parts whose operation would have to be relatively timed. This arrangement I regard as one of the principal points of the machine, as the parts with which the carrier coöperates at its extremes of movement are spring-supported, the liability of shock which might cause breakage is reduced, and the elastic pressure between the pile of labels and the carrier and also between the affixers, their label-carrying devices, and the bottle itself is provided. The shoes on the label-carrier may be adjusted back and forth by the screws 20 to accommodate labels and bottles of different widths.

In case it is desired to apply two labels to the bottle—one to the neck, we will say, and another in the usual position on the body—I provide the oscillating frame 9 with additional label-carrying shoes 18$^\times$, as shown in Figs. 19 and 20, above the main label-carrying surfaces and arrange over them additional affixer-arms 22$^\times$, similar to the arms 22, operated upon by springs 25$^\times$ and having their outer curved ends 24$^\times$ arranged to coöperate with rollers 70 on extensions 71 of the operating-arms 26, said extensions in this instance being provided with rollers 29$^\times$ in addition to the rollers 29, which actuate directly the arms 22, carrying the main affixers, said additional rollers 29$^\times$ serving to guide and retain the arms 24, as particularly shown in Fig. 20. This arrangement, in which the extensions of the affixers pass between two projections or rollers on the arms and are positively operated in opposite directions, is in some instances employed on the form of machine shown in Figs. 1 and 8, as it insures the opening of the affixers and positively removes the bottle from the rest after the label has been applied, thereby preventing any interference with the operation of the machine if through negligence on the part of the operator the bottle has not been removed in time.

The small neck-labels applied by the devices just described are arranged in a tilting label-holder 72, pivoted at 73 on the support, and are provided with centering or steadying pins 74 and 75, the latter preferably adjustable and the inner end of said holder being held downward by a spring 76, so that substantially the same angular coöperation of the pile of labels and the shoes 18$^\times$ is accomplished as heretofore described. This construction of the auxiliary holder is particularly shown in Figs. 17 and 18, and it is supported on the extreme end of the frame 53 beyond the main label-holder.

In some instances it is desirable to apply labels which are smaller than the diameter of the bottle, and in order that this may be accomplished the paste-label-carrying shoes must be separated when or as they pass the bottle, but preferably not by engagement with the bottle. These shoes (indicated by 18$^y$, Figs. 14 to 16) are mounted upon brackets 80, pivoted at 81 on the frame 9 and adjustable on said brackets toward and from the center line of the bottle by means of adjusting-screws 82, as shown in Fig. 16. The brackets 80 are further provided with arms 83, extending downward and inward beneath the bottle-support, and the extreme ends of said arms are provided with rollers 84 and are connected by the spring 85. This spring serves to keep the shoes together during the movement of the label-carrier to receive the paste and while picking up the label; but the rollers 84 are arranged to coöperate with cam-surfaces 86, arranged beneath the bottle-rest, so that as soon as the label is brought in contact with the surface of the bottle the cam-surfaces 86 will cause the separation of the label-shoes, and the affixers immediately engaging said label the latter will be applied to the bottle in the manner previously described, the cams 86 holding the brackets 80 separated until the label-carrier moves away from the bottle-support. I have shown these separable label-carrying shoes adapted for circular or oval labels; but it will be understood that small rectangular or other shaped labels could be applied by the same means if desired.

The affixers in this device are operated by rollers or projections 29 on the arms 26 or by a pair of projections in the same manner that the other forms of affixers are operated.

An adjustable gage 4$^\times$ is applied to the side of the bottle-rest 4, consisting in the present instance of a slotted spring-arm longitudinally adjustable to enable the operator to place each label in the same relative position on the bottle.

Various modifications of the details herein shown will readily occur to those skilled in the art, and I do not, therefore, wish to be confined to this form; but I have found that this machine is well adapted for the purpose intended and that the labels may be applied to bottles about as fast as the operator can conveniently place them in position on the support and remove them, using both hands for the purpose.

I claim as my invention—

1. The combination with a pivoted oscillatory label-carrier having shoes thereon, of a label-holder pivoted between its ends on a center parallel with that on which the carrier moves, and means for yieldingly maintaining the holder tilted and with the end farthest removed from the center of motion of the carrier elevated.

2. The combination with the bottle-rest, the bifurcated label-carrier pivoted to oscillate on a fixed center and having the shoes adapted to extend on opposite sides of a bottle on the rest, of a label-holder pivoted between its ends on a center parallel with that of the carrier, and means for yieldingly maintaining the holder tilted with the end farthest removed from the center of motion of the carrier elevated.

3. The combination with the bottle-rest, the label-carrier pivoted to oscillate on a fixed center and having the shoes thereon, of a yielding support, a label-holder pivoted on the support between its ends on a center parallel with that of the carrier, and means for yieldingly maintaining the holder tilted with the end farthest removed from the center of motion of the carrier elevated.

4. In a labeling-machine, the combination of a pivoted label-holder pivoted between its ends, a relatively movable label-carrier having shoes adapted to engage the surface of a label on the holder, and means for normally maintaining the holder with its surface tilted at an angle to the shoes on the carrier.

5. In a labeling-machine, the combination with a pivoted label-holder, and a yielding support therefor, of a movable label-carrier having shoes adapted to engage the surface of a label on the holder, and means for normally maintaining the holder with its surface tilted at an angle to the shoes on the carrier.

6. In a labeling-machine, the combination with a pivoted and yielding frame, and a label-holder pivoted on said frame, of a pivoted label-carrier having shoes adapted to engage a label on the holder, and means for yieldingly maintaining the label-holder with its surface out of parallelism with the shoes on the carrier.

7. In a labeling-machine, the combination with the label-carrier having the shoes, and the label-holder support having the spring, said carrier and support being pivoted on coincident centers, of the label-holder pivoted on the support, means for maintaining the holder tilted with its surface out of parallelism with the shoes on the carrier when the latter first coöperates with the label-holder.

8. In a labeling-machine, the combination with the yielding label-holder support, the label-holder pivoted thereon, and the spring for tilting it, of the movable label-carrier having the shoes coöperating with labels on the holder, the affixers on the carrier, and means for operating said affixers, and a bottle-rest.

9. In a labeling-machine, the combination with the label-holder support, having the label-holder thereon, of the oscillatory label-carrier having the affixers, and the shoes for coöperating with labels on the holder, said holder-support and carrier being pivoted on the same center, the bottle-rest, and means for operating the affixers.

10. In a labeling-machine, the combination with the label-holder support, having the label-holder thereon, the oscillatory label-carrier having the affixers and the shoes for coöperating with the labels on the holder, said holder-support and carrier being pivoted on the same center, of devices for applying paste to the shoes, a bottle-rest, and means for operating the affixers, substantially as described.

11. In a labeling-machine, the combination with the yielding label-holder support, having the label-holder thereon, the oscillatory label-carrier having the pivoted affixers and the shoes for coöperating with the labels on the holder, and the yielding arms for operating with the affixers, said arms, carrier and label-holder support being pivoted on the same center, of a stationary bottle-rest, and means for applying paste to the shoes when the oscillatory carrier moves in one direction, substantially as described.

12. In a labeling-machine, the combination with the bottle-rest, of an oscillatory label-carrier having shoes adapted to pass on opposite sides of the bottle, and the affixers on said carrier for coöperating with the label, substantially as described.

13. In a labeling-machine, the combination with the bottle-rest, of an oscillatory label-carrier, having the shoes adapted to pass on opposite sides of the bottle, the affixers pivoted on the carrier, and means for operating the affixers over and away from the shoes, substantially as described.

14. In a labeling-machine, the combination with the bottle-rest, of an oscillatory label-carrier having the shoes adapted to pass on opposite sides of the bottle, spring-operated affixers pivoted on the carrier and pivoted yielding arms with which the affixers coöperate to cause their movement over the bottle.

15. In a labeling-machine, the combination with the bottle-rest, of an oscillatory label-carrier having the shoes adapted to pass on opposite sides of the bottle, spring-operated affixers pivoted on the carrier, having the curved arms, and the yielding arms, each having two projections with which the affixer-arms engage.

16. In a labeling-machine, the combination with the pivoted oscillatory label-carrier having the shoes and the movable affixers thereon, of a pasting device coöperating with the shoes and movable in an arc intersecting that in which the shoes move.

17. In a labeling-machine, the combination with the label-carrier, having the shoes and the movable affixers thereon and movable in the arc of a circle, of a paste-applying roller mounted on a pivoted frame and movable in an arc intersecting that in which the shoes operate.

18. In a labeling-machine, the combination with the movable label-carrier having the shoes and the movable affixers thereon, of the paste-receptacle, the roller therein, the oscillating frame having the paste-roller thereon arranged to coöperate with the paste-roller when moved in one direction and to coöperate with the shoes when moved in the other direction.

19. In a labeling-machine, the combination with the bottle-rest, the pivoted label-carrier having the shoes and affixers thereon, the yielding label-holder support, the yielding arms for coöperating with and actuating the affixers, said carrier-support and arms being movable on the same center, an oscillatory frame and a pasting device thereon, said pasting device being movable in an arc to intersect that traversed by the shoes on the carrier.

20. In a labeling-machine, the combination with the transverse shaft 3, the label-carrier pivoted thereon, having the shoes and pivoted affixers, the yielding supporting-frame pivoted on the shaft, the tilting label-holder on the supporting-frame, and the yielding arms also pivoted on the shaft, of the bottle-rest, and the vibratory paste-applying device coöperating with the carrier-shoes.

21. The combination with the bottle-rest having the adjustable supporting-foot, of the oscillatory label-carrier having the affixers and the label-shoes thereon.

22. The combination with the oscillatory carrier-frame, having the label-shoes thereon, of the label-affixers pivoted at the sides of said frame, springs for removing said affixers from above the shoes, and means for turning the affixers over the shoes.

23. The combination with the bottle-rest, of the oscillatory frame having two pairs of label-carrying shoes thereon, two pairs of spring-operated affixers coöperating with the shoes, and yielding arms with which the affixers coöperate.

24. The combination with a bottle-rest, of an oscillatory frame having separable label-carrying shoes thereon, pivoted affixers also mounted on said frame and extending over the shoes, means for operating the affixers on their pivots and relatively stationary cam-surfaces for separating the carrying-shoes.

25. The combination with a bottle-rest, of a bifurcated frame having laterally-movable label-supporting shoes thereon said rest and frame being relatively movable and cam-surfaces connected to the rest and coöperating with the shoes for causing their positive separation when passing the bottle-rest.

26. The combination with the bottle-rest, and the cam-surfaces beneath it, of the oscillatory bifurcated frame, the spring-operated brackets pivoted thereon, having the arms or extensions for coöperating with the cam-surfaces on the rest and the label-shoes on the brackets.

27. The combination with the bottle-rest, of the bifurcated oscillating label-carrier having the affixers thereon, and the adjustable label-shoes mounted on the carrier.

28. The combination with the bottle-rest, of the oscillatory counterweighted carrier-frame having the shoes and the affixers thereon, and devices for operating the affixers, of the label-holder, means for applying paste to the shoes arranged between the rest and label-holder, the rotary shaft having the crank, and the pitman connected to the oscillatory frame.

29. In a labeling-machine, a label-affixing device for applying a pasted label to a bottle, consisting of two flexible strips separated by a space and adapted to engage the label in succession.

30. In a labeling-machine, a label-affixing device for applying a pasted label to a bottle, consisting of two flexible strips adapted to engage the label in succession, said strips being of different lengths and separated by a space, the shorter strip being arranged to engage the label first.

31. In a labeling-machine, the combination with the label-carrier, having the shoes, of the label-affixers movable thereon and arranged to project over the carrying-shoes, said affixers each consisting of a pair of flexible strips of different lengths, the members of each pair being separated by a space and adapted to engage the label in succession when applied to the bottle.

32. The combination with the stationary bottle-rest, and the label-gage thereon arranged to coöperate with a bottle and adjustable vertically thereof to enable the label to be properly positioned, of label-applying devices arranged to apply a label to the bottle while on the rest, substantially as described.

33. The combination with a pivoted oscillatory label-carrier having the shoes thereon, of a label-holder pivoted on a center parallel with that on which the carrier moves, and means for yieldingly maintaining the holder tilted and with one end elevated, the ends of said carrier-shoes extending substantially even with the elevated ends of the labels on the carrier.

34. The combination with a pivoted oscillatory label-carrier having the shoes thereon, of a label-holder pivoted on a center parallel with that on which the carrier moves, and having label-guides thereon, said carrier-shoes being adapted to extend below the top of the label-guides on the holder when coöperating with a label thereon and their ends extending substantially even with the elevated ends of the labels, and means for yieldingly maintaining the holder with one end elevated.

GEORGE F. GIPNER.

Witnesses:
F. F. CHURCH,
G. A. RODA.